United States Patent [19]
Kishimoto et al.

[11] Patent Number: 5,268,759
[45] Date of Patent: Dec. 7, 1993

[54] TELEVISION SIGNAL ENHANCING APPARATUS

[75] Inventors: Masaki Kishimoto; Hiroaki Takano, both of Kanagawa, Japan

[73] Assignee: Sony Corporation, Japan

[21] Appl. No.: 710,334

[22] Filed: Jun. 5, 1991

[30] Foreign Application Priority Data

Jun. 12, 1990 [JP] Japan .................................. 2-153598

[51] Int. Cl.⁵ .............................................. H04N 5/14
[52] U.S. Cl. .................................... 358/166; 358/167; 358/37
[58] Field of Search ................... 358/166, 37, 167, 36

[56] References Cited

U.S. PATENT DOCUMENTS

| | | | |
|---|---|---|---|
| 4,511,922 | 4/1985 | Lewis | 358/166 |
| 4,550,437 | 10/1985 | Kobayashi | 358/166 |
| 4,570,193 | 2/1986 | Yamashita | 358/166 |
| 4,587,576 | 5/1986 | Hirota | 358/166 |
| 4,618,928 | 10/1986 | Honda | 358/167 |
| 4,700,345 | 10/1987 | Morcom | 358/37 |
| 4,733,300 | 3/1988 | Sugiyama et al. | 358/166 |
| 4,747,157 | 5/1988 | Kurakake | 358/37 |
| 4,760,605 | 7/1988 | David | 358/37 |
| 4,912,551 | 3/1990 | Ozaki | 358/37 |
| 5,043,814 | 8/1991 | Lish | 358/166 |

FOREIGN PATENT DOCUMENTS 2162402 1/1986 United Kingdom .

Primary Examiner—James J. Groody
Assistant Examiner—Sherrie Hsia
Attorney, Agent, or Firm—Ronald P. Kananen

[57] ABSTRACT

A television signal processing apparatus for constructing an image plane by using an interpolation based on a plurality of adjacent pixel data The data of a total of five or more pixels of an object pixel and a plurality of pixels which are adjacent to the object pixel is extracted. An enhancing component by arithmetically processing the data of said five or more pixels. An enhancing component is then added to the object pixel.

6 Claims, 6 Drawing Sheets

Fig. 8A

| |
|---|
| $U_0 = DI_0$ |
| $U_1 = 0$ |
| $U_2 = DI_2$ |
| $U_3 = 0$ |
| ... |
| $U_{2\ell-3} = 0$ |
| $U_{2\ell-2} = DI_{2\ell-2}$ |

| |
|---|
| $X_0 = U_0$ |
| $X_1 = (U_0+U_2)/2$ |
| $X_2 = U_2$ |
| $X_3 = (U_2+U_4)/2$ |
| ... |
| $X_{2\ell-3} = (U_{2\ell-4}+U_{2\ell-2})/2$ |
| $X_{2\ell-2} = U_{2\ell-2}$ |

21

TELEVISION SIGNAL ENHANCING APPARATUS

BACKGROUND OF THE INVENTION

1. Field of the Invention

The invention relates to a television signal processing apparatus, more particularly, to an outline enhancing circuit of a television signal which is applied to a television signal of one pseudo frame formed by interpolation from the television signal of one field.

2. Description of the Prior Art

In a video printer to obtain a hard copy of a television image, in the case where an image of one frame has been printed, a problem occurs in that a resultant image blurs due to the interlace scan. Thus, a pseudo frame image is produced from one field of the original television signal to be printed. As mentioned above, to form the pseudo frame signal from the field signal, it is necessary to produce the missing information by interpolation. As an interpolating method, it has been known to calculate a mean value between lines of the signal of the original field and to use the mean value as a signal of the other fields being interpolated.

FIG. 1 shows an example of a circuit to interpolate a mean value between lines. Reference numeral 31 denotes an input terminal. Input data Un is data of a source (original) field such as an even-numbered field, in which pixel data of columns in the vertical direction are located in accordance with the order from the upper position to the lower position. That is, data corresponding to the horizontal scan of the ordinary television scan is changed to data of the vertical scan. There are provided delay circuits 32 and 35 each having a delay amount corresponding to a sampling period of the pixel data on a time base in the vertical direction.

The input data Un and output data of the delay circuit 32 are added by an adder 33. An output of the adder 33 is supplied to a ½ magnifying circuit 34. An Output of the ½ magnifying circuit 34 is supplied to the delay circuit 35. The output of the ½ magnifying circuit 34 and an output of the delay circuit 35 are supplied to an adder 36. An output $X_{n-1}$ of the adder 36 is taken out to an output terminal 37. The output $X_{n-1}$ is used as data of the interpolated field, for example, the odd-numbered field.

A transfer function TFi(Z) of the interpolating circuit shown in FIG. 1 is expressed by the following equation.

$$TFi(Z) = \tfrac{1}{4}(Z + 2 + Z^{-1}) \tag{1}$$

Therefore, although the data of the even-numbered field as a source field has a flat frequency characteristic shown by reference numeral 38a in FIG. 2, the data of the odd-numbered field as an interpolation field is such that, as shown by reference numeral 38b, a gain decreases as a frequency rises and the gain is equal to 0 at a frequency of ¼ fs (fs:sampling frequency on the time base in the vertical direction).

The above line mean interpolation can be realized by a very simple construction and is preferable from viewpoints of gradations, jerkiness, and the like as compared with a method of producing a frame signal by generating the signal of the same field twice. However, there are problems such that a vertical definition is low and the image blurs. Therefore, to improve an apparent sharpness, an outline in the vertical direction is enhanced.

FIG. 3 shows an example of a conventional outline enhancing circuit. Delay circuits 42 and 43 each having a delay amount of a vertical sampling period are serially connected to an input terminal 41. Input data $X_n$ and an output of the delay circuit 43 are supplied to an adder 44. An output of the adder 44 which has been transmitted through a ½ magnifying circuit 45 and an output of the delay circuit 42 are supplied to a subtracter 46. An output signal of the subtracter 46 is taken out to an output terminal 48 as an output signal $W_{n-1}$ through an amplifier 47 of a gain b.

The conventional outline enhancing circuit executes a process of $$W_n = \tfrac{1}{2}b(-X_{n-1} + 2X_n - X_{n+1}).$$

Due to this, the data of a total of three pixels comprising an object pixel as an object to be processed and upper and lower pixels adjacent the object pixel are digitally subjected to a quadratic differentiation. A transfer function TFe'(Z) from the input terminal 41 of the outline enhancing circuit to the output terminal 48 is as follows.

$$TFe'(Z) = \tfrac{1}{2}b(-Z + 2 - Z^{-1}) \tag{2}$$

The interpolating circuit shown in FIG. 1 and the outline enhancing circuit shown in FIG. 3 are serially connected for the data of the interpolation field (i.e., the interpolated field, in this case the odd-numbered field). Therefore, an overall transfer function from the input terminal 31 in FIG. 1 to the output terminal 48 in FIG. 3 is obtained by multiplying the transfer functions shown by the equations (1) and (2).

$$TFi(Z)TFe'(Z) = \tfrac{1}{4}b(-Z^2 + 2 - Z^{-2}) \tag{3}$$

For the signal of the source field (even-numbered field) having the flat frequency characteristic 38a, the Output signal of the outline enhancing circuit has a frequency characteristic as shown at reference numeral 49a in FIG. 4 in which a high frequency band is emphasized. On the other hand, for the signal of the interpolation field (again, in this case the odd-numbered field) having the frequency characteristic 38b in which a high frequency band is reduced, the output signal of the outline enhancing circuit has a frequency characteristic shown at reference numeral 49b. For the latter case no quadratic differentiation component is generated and there is a problem such that the effect of the outline enhancement is not obtained. Thus, there is a problem such that the frequency characteristics are quite different between the two fields.

OBJECTS AND SUMMARY OF THE INVENTION

It is, therefore, an object of the invention to provide a signal processing apparatus for a television signal in which a jerkiness can be suppressed and a good sharpness can be obtained by a simple circuit construction.

According to an aspect of the present invention, there is provided a television signal processing apparatus for constructing an image plane by performing an interpolation based on a plurality of adjacent pixel data comprising:

first means for extracting data of a total of five or more pixels including an object pixel and a plurality of pixels adjacent to the object pixel;

second means for generating an enhancing component by arithmetically processing the data of the five or more pixels; and third means for adding the enhancing component to the object pixel.

In this invention, three adjacent pixel data are used for the line mean interpolation. The outline enhancing circuit which is connected to the line mean interpolation uses the object pixel and four (or more) upper and lower or right and left pixels. Thus, the outline enhancing effect is also provided for the interpolation field (i.e., again, the interpolated field, in this case the odd-numbered field). When the outline has been enhanced, the differences between the frequency characteristics of the source field and the interpolation field are not so great as in the prior art above.

The above, and other, objects, features and advantages of the present invention will become readily apparent from the following detailed description thereof which is to be read in connection with the accompanying drawings.

BRIEF DESCRIPTION OF THE DRAWINGS

FIGS. 8A and 8B are schematic diagrams for use in explanation of the operation of the embodiment of the invention.

DETAILED DESCRIPTION OF THE PREFERRED EMBODIMENTS

Figure 5:
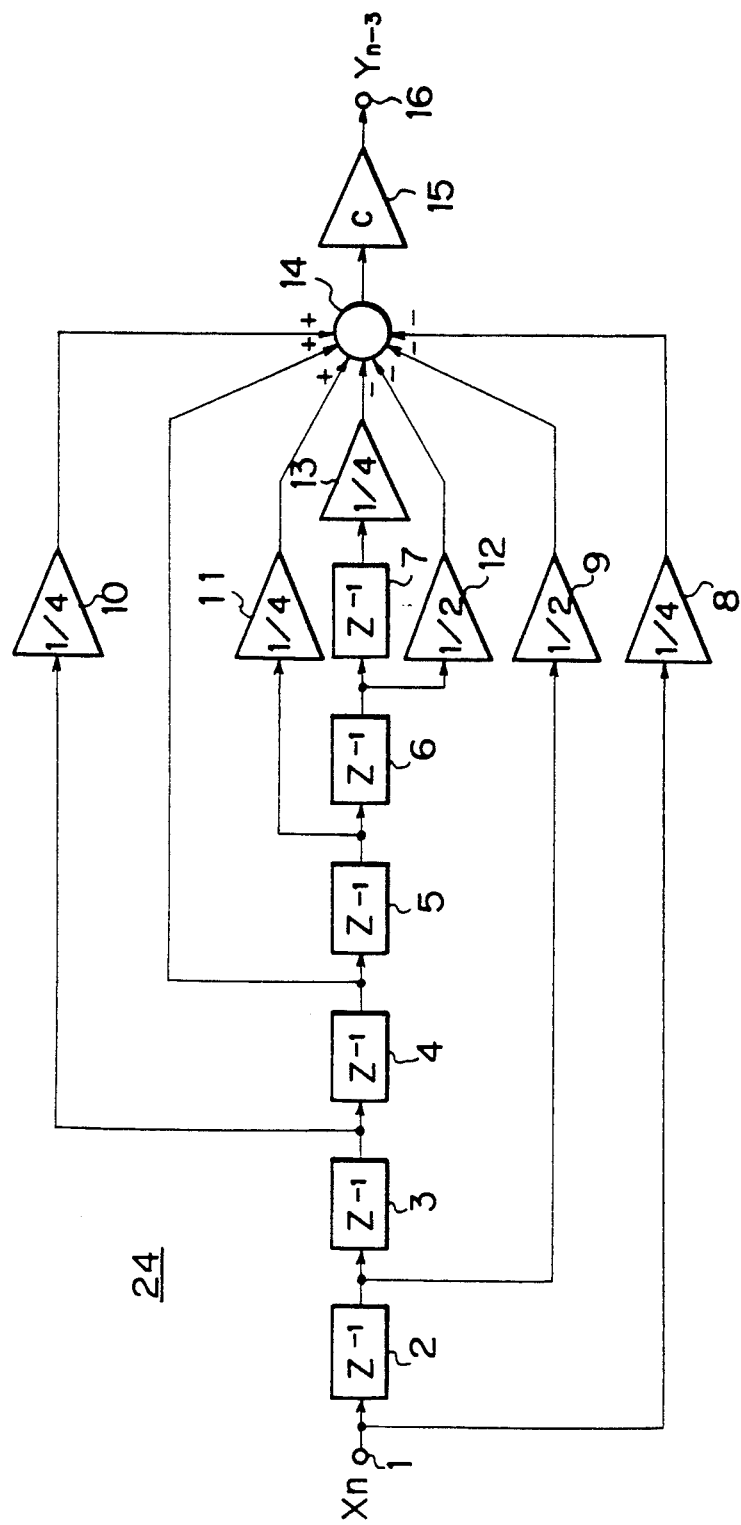
FIG. 5 is a block diagram of an embodiment of the invention.
Figure 7:
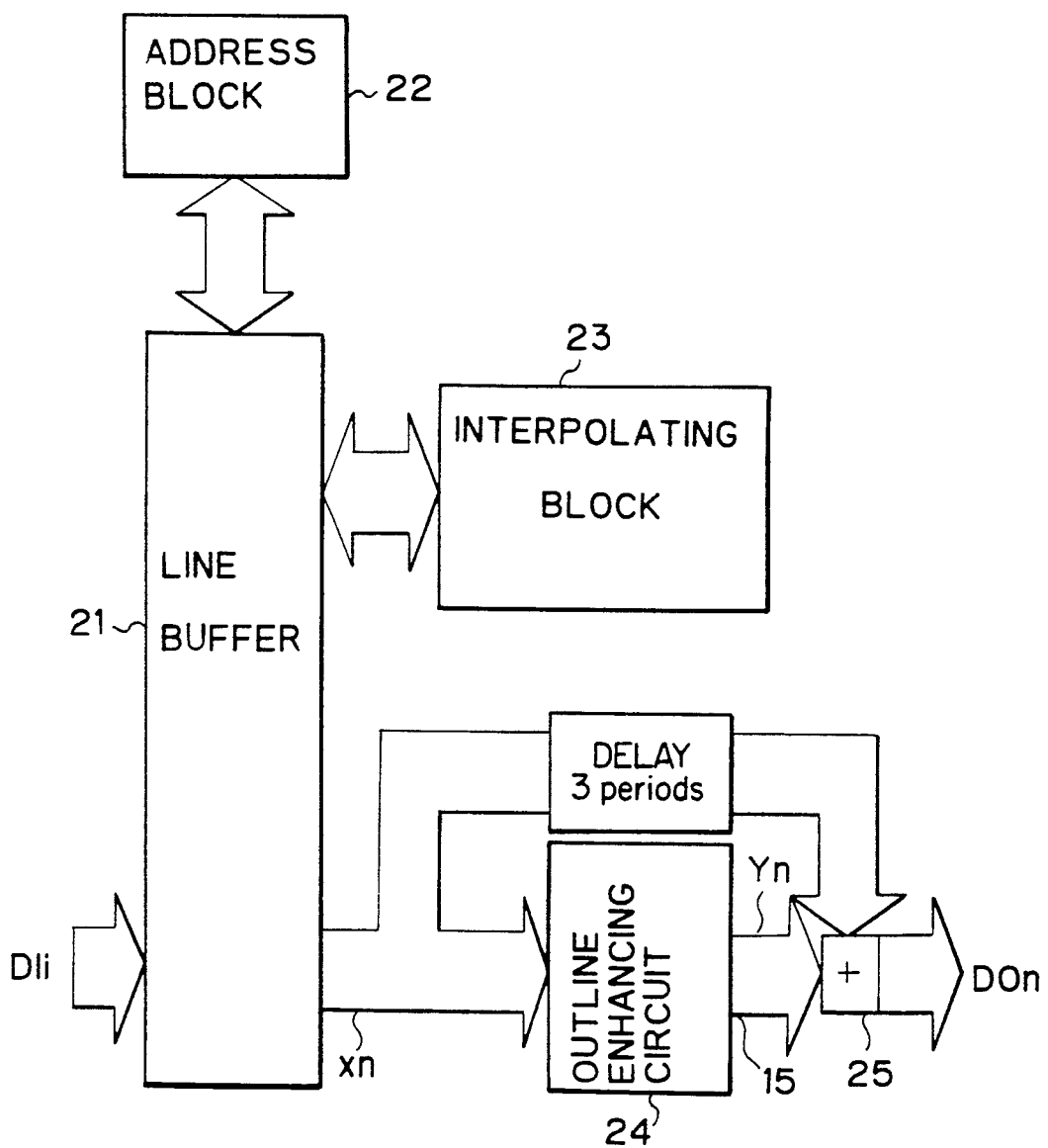
FIG. 7 is a block diagram showing a whole construction of the embodiment of the invention.

An embodiment of the invention will be described hereinbelow with reference to the drawings. FIG. 5 shows a construction of an outline enhancing circuit 24 according to the embodiment. As shown in FIG. 7, data from a line buffer 21 is supplied through a data bus to an input terminal 1 in FIG. 5.

Figure 1:
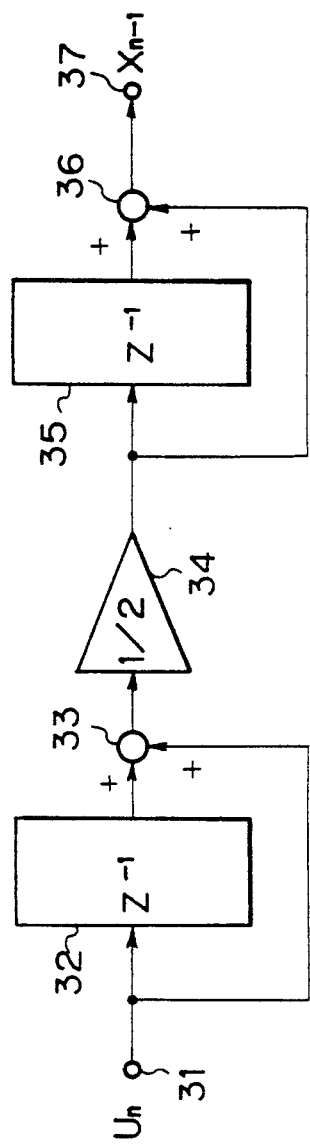
FIG. 1 is a block diagram of a line mean interpolating circuit.
Figure 3:
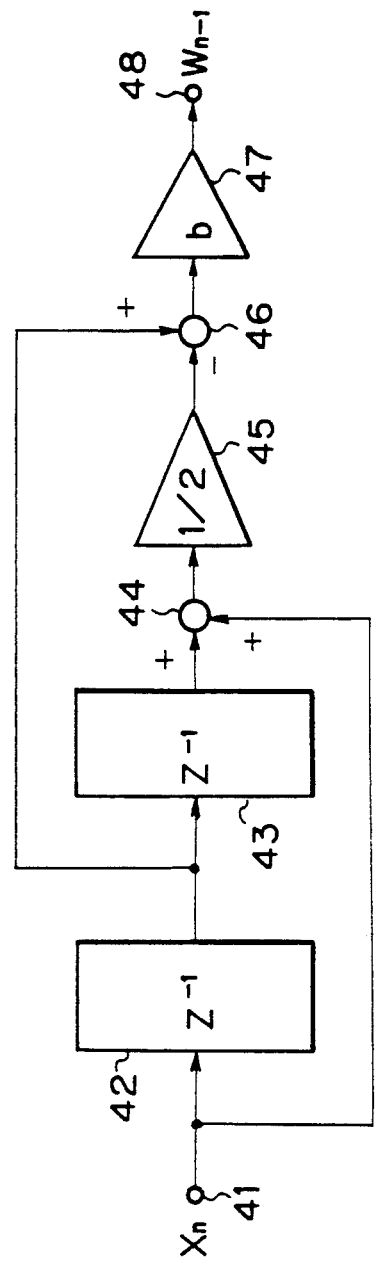
FIG. 3 is a block diagram of a conventional outline enhancing circuit.
Figure 2:
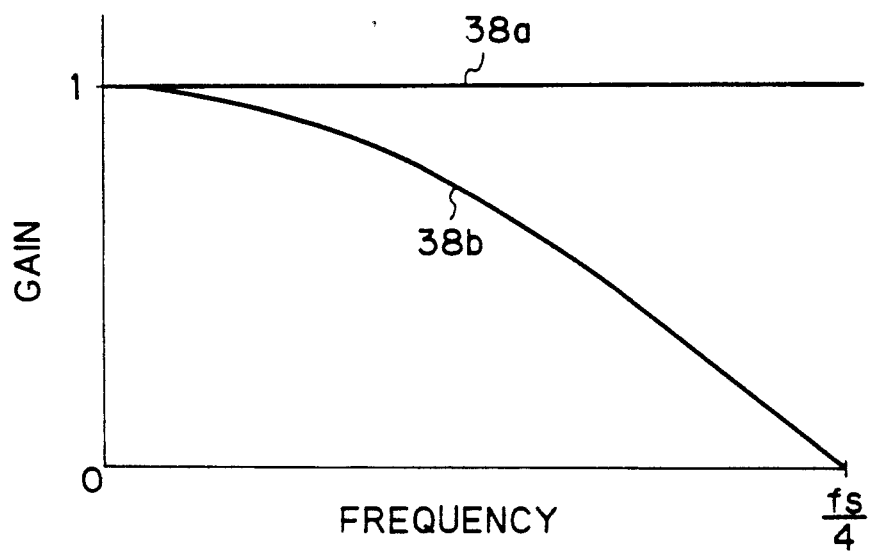
FIG. 2 is a schematic diagram showing frequency characteristics of the fields interpolated by the line mean interpolation.

The line buffer 21 is constructed by, for instance, a RAM having a capacity which can store pixel data of one column in the vertical direction of an image of one frame. An address signal of the line buffer 21 is formed by an address block 22. An interpolating block 23 is connected to the line buffer 21 through the data bus. The interpolating block 23 has the construction shown in FIG. 1 mentioned above and generates the interpolation data for the odd-numbered field from the original source data of the even-numbered field by the line mean interpolation (i.e., interpolated or odd-numbered field). The interpolation data is written into the line buffer 21.

Input data is supplied to the line buffer 21. The input data is read out of a field memory (not shown). Data DIi (i=0, 2, 4, ..., 2l−2; l denotes the number of pixels of one column) of one column in the vertical direction are sequentially written into the line buffer 21 from the field memory. In this case, both of the data DIi and the zero data are alternately written as shown in FIG. 8A by the address control from the address block 22. A data train stored in the line buffer 21 is expressed by Un (n=0, 1, 2, ..., 2l−2).

The data train Un from the line buffer 21 is then sequentially generated and supplied to the interpolating block 23. In the interpolating block 23, the following mean interpolations between lines are performed.

$$X_{2m} = U_{2m} \quad (m = 0, 1, \ldots, l - 1)$$
$$X_{2m+1} = (U_{2m} + U_{2m+2})/2 \quad (m = 0, 1, \ldots, l - 2)$$

The data train Xn is again transferred to the line buffer 21. Therefore, as shown in FIG. 8B, the data of one column in which the zero data has been substituted by the interpolation data is formed.

The data series Xn including the interpolation data are sequentially generated from the line buffer 21 and in parallel to supplied to the outline enhancing circuit 24 and an adder 25 via a delay of three time units. In the adder 25, an outline enhancing component Yn formed by the outline enhancing circuit 24 is added to the output data series Xn of the line buffer 21. Outline enhanced output data DOn (=Xn+Yn) is derived from the adder 25. In the case of a video printer, the output data DOn is pulse width modulated or amplitude modulated in accordance with the value of each data, so that it is converted into the driving signal. The driving signal is supplied to a thermal head through a driving amplifier. The terminal head is simultaneously executes the printing operations of one column onto a paper which is fed at predetermined speed through an ink ribbon on which a sublimation dye has been coated.

An example of the outline enhancing circuit 24 to which the invention is applied will no be described with reference to FIG. 5. Delay circuits 2, 3, 4, 5, 6, and 7 each having a delay amount of a sample hold period on the time base in the vertical direction are serially connected to the input terminal 1 to which the data series Xn from the line buffer 21 are supplied. Coefficient multipliers 8, 9, 10, 11, 12, and 13 are connected to the input terminal 1 and taps which are led out from the nodes among the delay circuits 2 to 7, respectively. Outputs which have been multiplied by predetermined coefficients are synthesized by a synthesizing circuit 14. The synthesized sum is taken out to an output terminal 16 through an amplifier 15 having a gain c. The gain c of the amplifier 15 is adjustable, thereby enabling the enhancement amount to be varied.

That is, the data from the input terminal 1 is supplied to the coefficient multiplier 8 of multiplier value ¼. A signal which is obtained by inverting an output from the coefficient multiplier 8 is supplied to the synthesizing circuit 14. An output signal of the delay circuit 2 is supplied to the coefficient multiplier 9 of multiplier value ½. A signal which is obtained by inverting an output from the coefficient multiplier 9 is supplied to the synthesizing circuit 14. An output signal of the delay circuit 3 is supplied to the synthesizing circuit 14 through the coefficient multiplier 10 of multiplier value ¼. An output signal of the delay circuit 4 is supplied to the synthesizing circuit 14. An output signal of the delay circuit 5 is supplied to the synthesizing circuit 14 through the coefficient multiplier 11 multiplier value of ¼. An output signal of the delay circuit 6 is supplied to the coefficient multiplier 12 of multiplier value ½. A signal which is obtained by inverting an output from the coefficient multiplier 12 is supplied to the synthesizing circuit 14. An output signal of the delay circuit 7 is supplied to the coefficient multiplier 13 of multiplier value ¼. A signal which is obtained by inverting an output from the coefficient multiplier 13 is supplied to the synthesizing circuit 14.

In the outline enhancing circuit 24 shown in FIG. 5, an outline enhancing component is formed from a total of seven pixel data comprising the data of an object pixel, three pixel data on the upper side of the object pixel, and three pixel data on the lower side of the object pixel. That is, when the output data of the delay circuit 4 assumes data Xn of the object pixel, the enhancing component Yn corresponding to the data Xn is shown by the following equation.

$$Y_n = \tfrac{1}{8}c(-X_{n-3} - 2X_{n-2} + X_{n-1} + 4X_n + X_{n+1} - 2X_{n+2} - X_{n+3}) \quad (4)$$

where,
$X_{-3} = X_{-2} = X_{-1} = X_o$
$X_{2l-1} = X_{2l} = X_{2l+1} = X_{2l-2}$ The transfer function TFe(Z) between the input terminal 1 of the above outline enhancing circuit 24 and the output terminal 16 is as follows.

$$TFe(Z) = \tfrac{1}{8}c(-Z^3 - 2Z^2 + Z + 4 + Z^{-1} - 2Z^{-2} - Z^{-3}) \quad (5)$$

Therefore, a transfer function regarding the interpolation field is as follows.

$$TFe(Z) \cdot TFi(Z) = c/8 \, (-Z^4 - 4Z^3 - 4Z^2 + 4Z + 10 + 4Z^{-1} - 4Z^{-2} - 4Z^{-3} - Z^{-4}) \quad (6)$$

Figure 6:
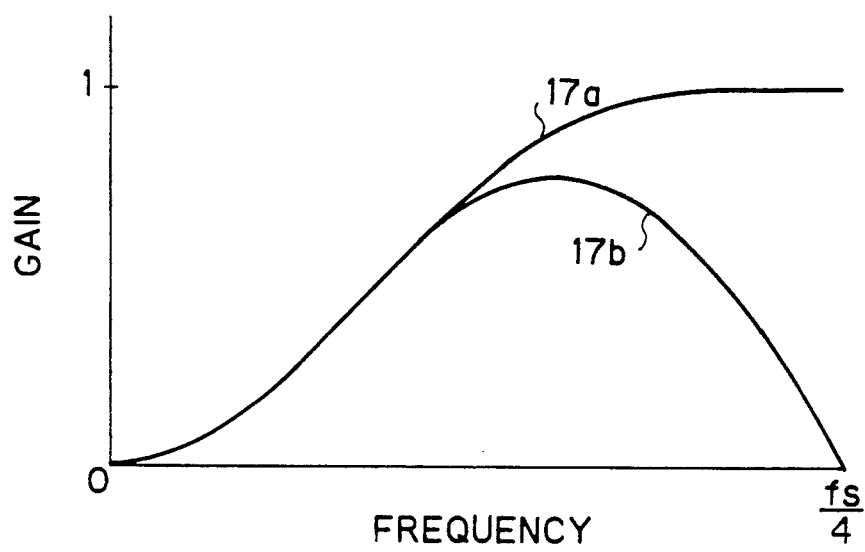
FIG. 6 is a schematic diagram showing frequency characteristics of the embodiment of the invention.

A frequency characteristic for the interpolation field, for instance, for the odd-numbered field as in the example here, is as shown at reference numeral 17b in FIG. 6 from the above transfer function. On the other hand, a frequency characteristic for the source field, for instance, for the even-numbered field in the example here, is as shown at reference numeral 17a from the transfer function TFe(Z) shown by the equation (5). As will be understood from FIG. 6, the outline enhancing effect is also derived for the interpolation field. Thus, there is not such a large difference between the frequency characteristic of the interpolation field and the source field. Further, by enhancing a relatively low frequency band, an aliasing component in the vertical direction of the image can be made inconspicuous.

Figure 4:
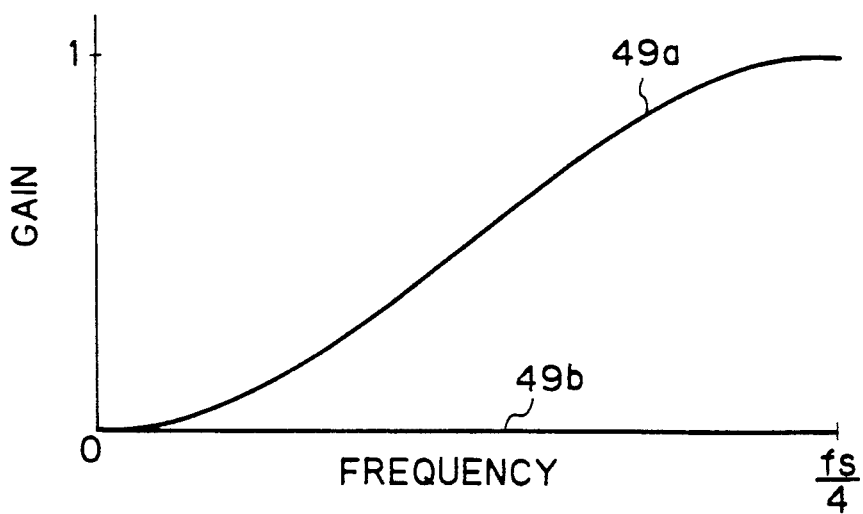
FIG. 4 is a schematic diagram showing frequency characteristics of the conventional outline enhancing circuit.

As will be understood from the above embodiment, according to the invention, the difference between the frequency characteristics of the interpolation field and the source field which results from the line mean interpolation is corrected effectively compensated for by the subsequent enhancing process. Therefore, a frequency characteristics of the two fields are closer, and also a frequency characteristic can be provided for the interpolation field without being limited to the frequency characteristic 49b in FIG. 4.

In the case of converting the frame image into the frame of a double density by the interpolation, the invention is not limited to the columns in the vertical direction but can be also applied to the case of performing the interpolation with respect to the columns (rows) in the horizontal direction. In addition, the invention can be applied to the case of magnifying the image by executing the interpolation with respect to both of the vertical and horizontal directions, and the like.

According to the invention, the outline enhancement can be also performed for the field interpolated by the data of two adjacent pixels. It is possible to prevent a large difference between the frequency characteristics of the source field and of the interpolation field when the outline has been enhanced. Further, since the signal processing circuit of the invention enhances the relatively low frequency band, the aliasing component in the vertical direction of the image can be made inconspicuous.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A television signal processing apparatus for constructing an image plane from a plurality of data of adjacent pixels obtained from a mean value interpolation of one field to drive another field, said apparatus comprising:

first means for extracting at a predetermined sampling frequency the data of seven adjacent pixels of said plurality of adjacent pixels data, including an object pixel and six adjacent pixels which are adjacent to said object pixel or to each other, wherein said object pixel is centrally located between the others of said seven adjacent pixels;

said first means comprises six delay elements successively arranged, each providing a delay equal to one period of said predetermined sampling frequency;

second means for generating an enhancing component by arithematically processing said data of seven adjacent pixels;

said second means comprises six coefficient multipliers for multiplying respective ones of said data of seven adjacent pixels by respective predetermined coefficients, as respectively input or output from respective ones of said delay elements;

wherein said predetermined coefficients for multiplying said data of said seven adjacent pixels and said respective inputs and outputs of said successively arranged delay elements, comprise:

the input of the first delay element being multiplied by $-\tfrac{1}{4}$;

the input of the second delay element, which is the output of the first delay element, being multiplied by $-\tfrac{1}{2}$;

the input of the third of said delay elements, which is the output of the second delay element, being multiplied by $+\tfrac{1}{4}$;

the input of the fourth of said delay elements, which is the output of the third delay element, being not multiplied;

the input of the fifth of said delay elements, which is the output of the fourth delay element, being multiplied by $+\tfrac{1}{4}$;

the input of the sixth of said delay elements, which is the output of the fifth delay element, being multiplied by $-\tfrac{1}{2}$;

the output of said sixth delay element being multiplied by $-\frac{1}{4}$; and third means for adding said enhancing component to said object pixel.

2. A television signal processing apparatus according to claim 1, wherein said second means comprises;

said six coefficient multipliers for multiplying said seven adjacent pixels by predetermined coefficients;

a synthesizing circuit for combining output signals of said coefficient multipliers; and an amplifier for setting a gain of an output signal of said synthesizing circuit for said adding with said object pixel.

3. A television signal processing apparatus according to claim 1, or 2, further comprising:

a line buffer for storing at respective addresses thereof said pixels data of said one field as a source field of one column in a vertical direction of a frame; and means for generating address signals for said addresses of said line buffer to provide said data of said one field for the operation of said mean value interpolation.

4. The apparatus of claim 1, wherein said seven adjacent pixels correspond to a vertical column in a frame of a television image.

5. The apparatus of claim 1, wherein said seven adjacent pixels correspond to a horizontal column in a frame of a television image.

6. The apparatus of claim 1, wherein said seven adjacent pixels correspond to a portion of a television image that is being magnified by said interpolation and enhanced by said first, second and third means.

* * * * *